United States Patent
Vogel et al.

(10) Patent No.: US 9,387,547 B2
(45) Date of Patent: Jul. 12, 2016

(54) POWER SKIVING TOOL FOR POWER SKIVING GEAR TEETH ON A CROWN WHEEL WORKPIECE

(71) Applicant: Klingelnberg AG, Zürich (CH)

(72) Inventors: Olaf Vogel, Ettlingen (DE); Judith Nägele, Karlsruhe (DE)

(73) Assignee: Klingelnberg AG (CH)

( * ) Notice: Subject to any disclaimer, the term of this patent is extended or adjusted under 35 U.S.C. 154(b) by 185 days.

(21) Appl. No.: 14/255,069

(22) Filed: Apr. 17, 2014

(65) Prior Publication Data

US 2014/0314504 A1 Oct. 23, 2014

(30) Foreign Application Priority Data

Apr. 17, 2013 (EP) .................................. 13164133

(51) Int. Cl.
| | |
|---|---|
| B23F 21/00 | (2006.01) |
| B23F 21/24 | (2006.01) |
| B23F 21/04 | (2006.01) |
| B23F 5/16 | (2006.01) |
| B23F 15/06 | (2006.01) |
| B23F 5/20 | (2006.01) |

(52) U.S. Cl.
CPC .............. B23F 21/245 (2013.01); B23F 5/163 (2013.01); B23F 15/06 (2013.01); B23F 21/046 (2013.01); *Y10T 407/1745* (2015.01)

(58) Field of Classification Search
CPC ...... B23F 21/24; B23F 21/241; B23F 21/245; B23F 21/246; B23F 21/282; B23B 5/20; B23B 5/28
See application file for complete search history.

(56) References Cited

U.S. PATENT DOCUMENTS

| | | | | |
|---|---|---|---|---|
| 1,398,039 | A * | 11/1921 | Olson ..................... | B23F 15/06 407/20 |
| 2,304,586 | A * | 12/1942 | Miller ..................... | B23F 15/06 407/23 |
| 2,308,891 | A * | 1/1943 | Miller ..................... | B23F 5/16 407/28 |
| 2,711,673 | A * | 6/1955 | Miller ..................... | B23F 9/082 29/90.6 |
| 5,080,588 | A * | 1/1992 | O'Brien ................... | A61C 3/02 433/165 |
| 5,494,475 | A * | 2/1996 | Basstein ................. | B23F 15/06 407/28 |
| 5,720,584 | A * | 2/1998 | Sijtstra ................... | B23F 15/06 407/20 |
| 6,517,772 | B1 * | 2/2003 | Woolf ..................... | B21H 5/022 419/28 |

FOREIGN PATENT DOCUMENTS

| | | |
|---|---|---|
| DE | 1074366 B | 1/1960 |
| EP | 0699114 B1 | 10/1997 |
| WO | 2011017301 A1 | 2/2011 |

* cited by examiner

*Primary Examiner* — Will Fridie, Jr.
(74) *Attorney, Agent, or Firm* — McCarter & English LLP

(57) ABSTRACT

A power skiving tool for producing multiple tooth gaps by means of a power skiving method on a ring-shaped or disk-shaped workpiece, which has a workpiece axis of rotation is provided. The power skiving tool includes a tool axis of rotation, a skiving conical body, which is in the form of a hyperboloid or truncated cone, and which is arranged rotationally-symmetrically to the tool axis of rotation, and multiple cutting teeth, which protrude essentially radially out of a lateral surface of the skiving conical body. Each of the cutting teeth has a rake face and at least one cutting edge, and all rake faces have a cutting surface normal, which encloses an acute angle, which is less than 40°, with the tool axis of rotation, and wherein the power skiving tool is designed for axially-offset power skiving of the workpiece.

15 Claims, 10 Drawing Sheets

POWER SKIVING TOOL FOR POWER SKIVING GEAR TEETH ON A CROWN WHEEL WORKPIECE

CROSS-REFERENCE TO RELATED APPLICATIONS

This application claims priority under 35 U.S.C. §119(a)-(d) to European Patent Application No. 13 164 133.4, filed Apr. 17, 2013, the content of which is incorporated herein by reference in its entirety as part of the present disclosure.

FIELD OF THE INVENTION

The object of the invention is a power skiving tool, which is especially designed for producing or machining gear teeth on a crown wheel workpiece by means of a power skiving method.

BACKGROUND OF THE INVENTION

There are numerous methods for manufacturing gear wheels. In the case of chipping soft pre-machining, one differentiates hobbing, gear shaping, generating planing, and power skiving. Hobbing and power skiving are so-called continuous methods, as explained in greater detail hereafter.

This relates to the chipping machining of crown wheels. In conjunction with the disclosure herein, a crown wheel is considered to be a gearwheel, whose main body has a ring shape or disk shape and in which teeth are arranged in the region of one front side. Therefore, such gear wheels are sometimes also referred to as face gears in English. Such crown wheels are also distinguished in that they can be paired with a regular spur gear as a pinion.

A crown wheel, as used herein, has a face angle that, in the case of pairs that are not axially offset, corresponds to the axis angle between the axis of rotation of the crown wheel and the axis of rotation of the paired gearwheel pinion.

If the face angle of the crown wheel is 90°, such a gearwheel is also referred to as a planar face wheel.

A good overview of the already known methods for producing crown wheels can be inferred from the PCT application WO 2011/017301 A1. Further exemplary tools and methods are already known from the following documents: EP 0699114B1, DBP 1074366, and U.S. Pat. No. 2,308,891.

The two documents DBP 1074366 and U.S. Pat. No. 2,308,891 relate to methods for power skiving crown wheels. Heretofore, tools that have a shape like a cutting wheel have been used in power skiving. Such a tool is arranged axially-offset to the crown wheel in the case of power skiving, in order to thus generate the cutting components required for the chip-removing method kinematically. The tool is moved over the entire tooth width to form a tooth of the crown wheel. There are various movement approaches in this context.

It is a general requirement in this case to design the tool and the movement of the tool such that the desired tooth profile is generated in a sufficient tolerance at all points along the tooth width of the tooth of the crown wheel. The problem arises in this case due to the changing engagement angle over the tooth width together with the required axial offset of the tool. Since the tooth flank, for example, must extend radially in the case of a straight-toothed crown wheel, and since an engaging pinion has tooth flanks that extend parallel to its own pinion axis, it results from the intercept theorem that the engagement angle on the tooth flanks of the crown wheel must decrease from the outside to the inside.

The axial offset of the pair of pinion and crown wheel typically does not correspond to the axial offset of tool and crown wheel during the production.

For the mentioned reasons, only approximate solutions result in the case of the production of the tooth flanks on the crown wheel.

In addition, it is significant that the cutting conditions can change strongly from the outside to the inside (in relation to the workpiece) upon the use of a tool like a cutting wheel.

SUMMARY

For these reasons, heretofore only unsatisfactory results have been achieved in particular in the case of crown wheels having greater tooth widths.

An object of certain embodiments disclosed herein is to provide a tool for machining the gear teeth of a crown wheel, which delivers more precise results than previous tools.

This relates to the production or machining of crown wheels, as defined at the beginning. For example, expressed generally, it relates to the production or machining of the gear teeth on a crown-wheel-type workpiece.

This object is achieved according to embodiments disclosed herein by a tool, which is referred to here as a conical power skiving tool.

Specifically, this relates to a power skiving tool for producing or machining gear teeth on a (crown wheel) workpiece by means of a power skiving method. The power skiving tool has a conical main body having cutting teeth, which correspond to conjugated gear teeth of the gear teeth of the crown wheel or are derived from these conjugated gear teeth According to some embodiments, the power skiving tool is designed in relation to the conical gear teeth to be machined such that the cutting conditions during the power skiving are equivalent over the entire tooth width of the gear teeth. This is achieved by redefining a suitable taper angle of the main body, by establishing the skiving plane on the workpiece and the number of the cutting teeth (referred to as the tooth count), and by the corresponding arrangement/positioning of the power skiving tool in relation to the gear teeth to be machined.

According to some embodiments, a conjugated tooth of a tooth gap, which is to be produced or to be machined, of the conical gear teeth is ascertained (calculated). This conjugated tooth is the tooth of a virtual pinion, which is optimally paired with the conical gear teeth of the crown-wheel-type workpiece. At least two rake faces and cutting edges of the corresponding rake faces along the ascertained conjugated virtual tooth are now established. In this manner, at least two cutting edges are defined in the three-dimensional space.

Depending on the embodiment, these two or more than two cutting edges can have a uniform spacing to one another. However, they can also have different spacings. The spacing is observed here in the direction of the tooth width of the conjugated virtual tooth.

In certain embodiments disclosed herein, the crown wheels have a face angle $\Delta$ is between 60° and 120°.

In the theoretical consideration, multiple conjugated virtual teeth are now arranged along the circumference of the conical lateral surface of the conical main body of the power skiving tool. In the concrete implementation of the power skiving tool, these conjugated, virtual teeth are now "replaced" by so-called cutting teeth, or implemented in the form of real cutting teeth. In some embodiments, each of the conjugated teeth is implemented in the form of one, two, or more than two real cutting teeth. However, for example, if only every second conjugated tooth is implemented for reasons of space, this means that not every conjugated tooth is implemented as a cutting tooth. Therefore, embodiments are also possible in which not every conjugated tooth is used as a foundation for one or more cutting teeth.

Multiple exemplary embodiments result, which can be differentiated as follows.

Every conjugated virtual tooth is replaced by only one real cutting tooth, wherein the cutting teeth of the individual virtual teeth differ.

Every conjugated virtual tooth is replaced by only one real cutting tooth, wherein the cutting teeth of the individual virtual teeth differ within a group and the group repeats multiple times.

Every conjugated virtual tooth is replaced by multiple real cutting teeth (for example, two or three real cutting teeth per conjugated virtual tooth), wherein the cutting teeth of the individual virtual teeth differ.

Every virtual tooth is replaced by one or more real cutting teeth, wherein the cutting teeth of the individual virtual teeth differ within a group and the group repeats multiple times. For example, every second or third virtual tooth is replaced by one, two, or more than two real cutting teeth, wherein no real cutting teeth are implemented at the location of the respective other virtual teeth.

The term cutting tooth or cutting teeth is used here both in conjunction with one-piece (solid) tools, and also in conjunction with tools which are equipped with bar cutters. In the case of a solid tool, the cutting teeth and the main body, which was derived from a skiving conical body, are manufactured from one material.

Above all in the case of large tools, the cutting teeth can be implemented in the form of bar cutters. Chambers (receptacle regions) must be provided in this case in the main body of the tool, which was derived from a skiving conical body. These chambers of the main body do not also have to also be arranged offset to one another in accordance with the offset rake faces, since the bar cutter shaft thickness of the bar cutter permits a variation or adaptation of the rake face location over a specific width.

According to some embodiments, it is to be presumed that a small number of different chamber locations is sufficient for accommodating the bar cutters for the crown wheel machining using such a tool.

It is an advantage of embodiments disclosed herein that the tool—because of the use of multiple cutting edges of the tool over the cutting width of the workpiece—does not have to be moved over the entire tooth width to implement an entire tooth.

According to some embodiments, specific cutting edges of the cutting teeth are intended for machining specific regions of the gear teeth. If these regions are sufficiently small, the generated deviations of the tooth flanks from the setpoint geometry are also small.

According to some embodiments, the cutting edges and rake faces of the power skiving tool are located on different diameters. The tool thus has multiple cutting levels.

According to some embodiments, the rake faces of the cutting teeth are oriented forward, i.e., the rake faces point in the direction of the cone tip of the main body, which is in the form of a truncated cone, of the power skiving tool.

However, in some embodiments, the rake faces of the cutting teeth can also be oriented in the opposite direction. In this case, the rake faces point away from the cone tip of the main body, which is in the form of a truncated cone, of the power skiving tool.

According to some embodiments, the rake faces that are defined on a conjugated tooth can have the same spacing from one another. However, the spacing of the rake faces can also be different.

According to some embodiments, every virtual conjugated tooth can be replaced by multiple real cutting teeth, wherein the cutting teeth of the single virtual teeth differ.

According to some embodiments, every virtual conjugated tooth can be replaced by only one real cutting tooth, wherein the cutting teeth of the single virtual teeth differ from one another.

According to some embodiments, every virtual conjugated tooth can be replaced by only one real cutting tooth, wherein the cutting teeth of the single virtual conjugated teeth differ within a group and the group repeats multiple times along the circumference of the power skiving tool.

According to some embodiments, every virtual conjugated tooth can be replaced by one or more real cutting teeth, wherein the cutting teeth of the single virtual teeth differ within a group and the group repeats multiple times along the circumference of the power skiving tool.

According to some embodiments, for example, every second or third virtual two can be replaced by one, two, or more than two real cutting teeth, wherein no real cutting teeth are implemented at the location of the respective other virtual teeth.

In embodiments disclosed herein, the fact can be taken into consideration that the engagement angle changes over the tooth width and therefore in the case of axially-offset manufacturing, different cutting profiles are required for precise manufacturing. By using multiple cutting teeth per tooth gap that is to be machined, local adaptations can be performed on the profile.

Accordingly, embodiments disclosed herein allow more precise manufacturing of crown wheels than is possible using conventional skiving tools similar to cutting wheels.

Furthermore, embodiments disclosed herein allow precise and reliable manufacturing of such crown wheels in the power skiving method.

BRIEF DESCRIPTION OF THE DRAWINGS

Further details and advantages will be described hereafter on the basis of exemplary embodiments and with reference to the drawings.

DETAILED DESCRIPTION OF EMBODIMENTS OF THE INVENTION

Terms are used in conjunction with the present description, which are also used in relevant publications and patents. However, it is to be noted that the use of these terms is only to serve for better understanding. The idea of the invention and the scope of protection of the patent claims are not to be restricted in the interpretation thereof by the specific choice of the terms. The invention may readily be transferred to other term systems and/or technical fields. The terms are to be applied accordingly in other technical fields.

Figure 1A:
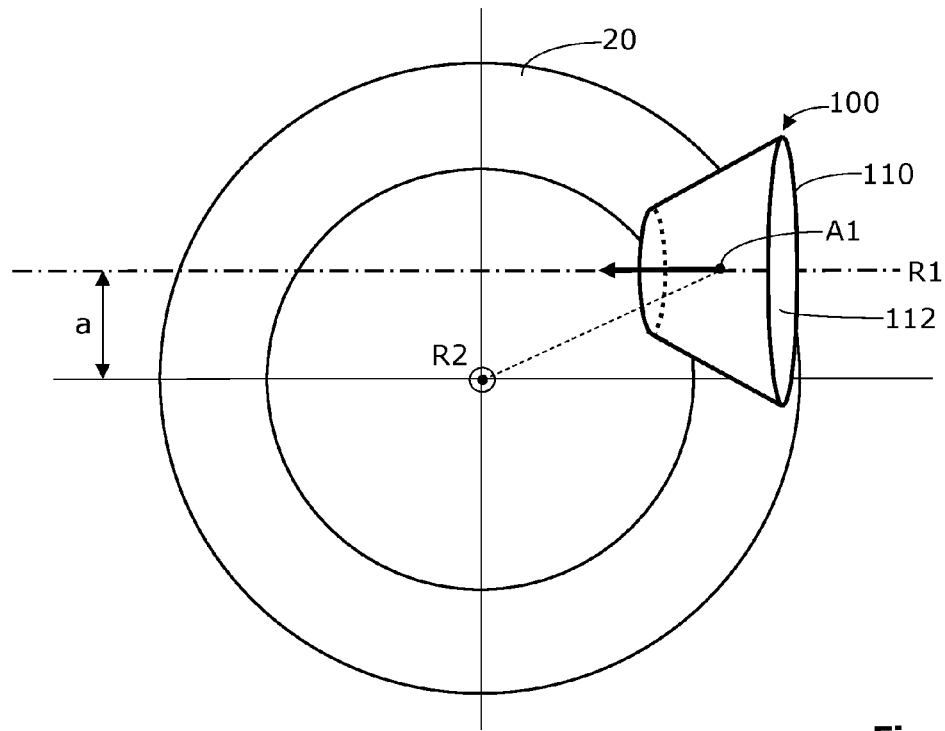
FIG. 1A shows a schematic top view of a pair made of a crown wheel and a power skiving tool of a first embodiment, wherein only the conical main body (in the form of a truncated cone) of the power skiving tool is shown here.

FIG. 1A shows a schematic top view of a pair made of a workpiece 20 (a crown wheel here) and a power skiving tool 100, wherein only the conical main body 110 of the power skiving tool 100 is shown here. As shown in FIG. 1A, the power skiving tool 100 is arranged having an axial offset "a" in relation to the workpiece 20. In addition, the power skiving tool 100 is slightly inclined, because of which the rear end face 112 is seen as an oval in FIG. 1A. By suitable selection of the conicity (partial taper angle δ, see FIGS. 1B and 1C) of the associated skiving conical body 110*, the cutting conditions during power skiving are equivalent over the entire tooth width of the gear teeth to be machined on the workpiece 20. This is achieved, inter alia, by predefining a suitable skiving conical body 110* having partial taper angle δ, and by establishing the skiving plane WE (see FIG. 1B) and the number of the cutting teeth (referred to as tooth count) and by the corresponding arrangement/positioning of the power skiving tool 100 in relation to the gear teeth of the workpiece 20.

The selection of the taper angle δ of the tool main body 110 is described in greater detail hereafter. Within the skiving plane WE (reference plane) of the crown wheel 20 (workpiece), different skiving circles can be selected along the tooth width direction (b identifies the tooth width). These differ due to their respective skiving circle diameter. For each of these skiving circles, a skiving circle diameter that is optimum for the power skiving machining results for the tool 100. Optimally means in this case that the cutting speed resulting from the coupled rotation of workpiece 20 and tool 100 respectively points in the gap direction of the tooth gap 22 to be machined.

Figure 1B:
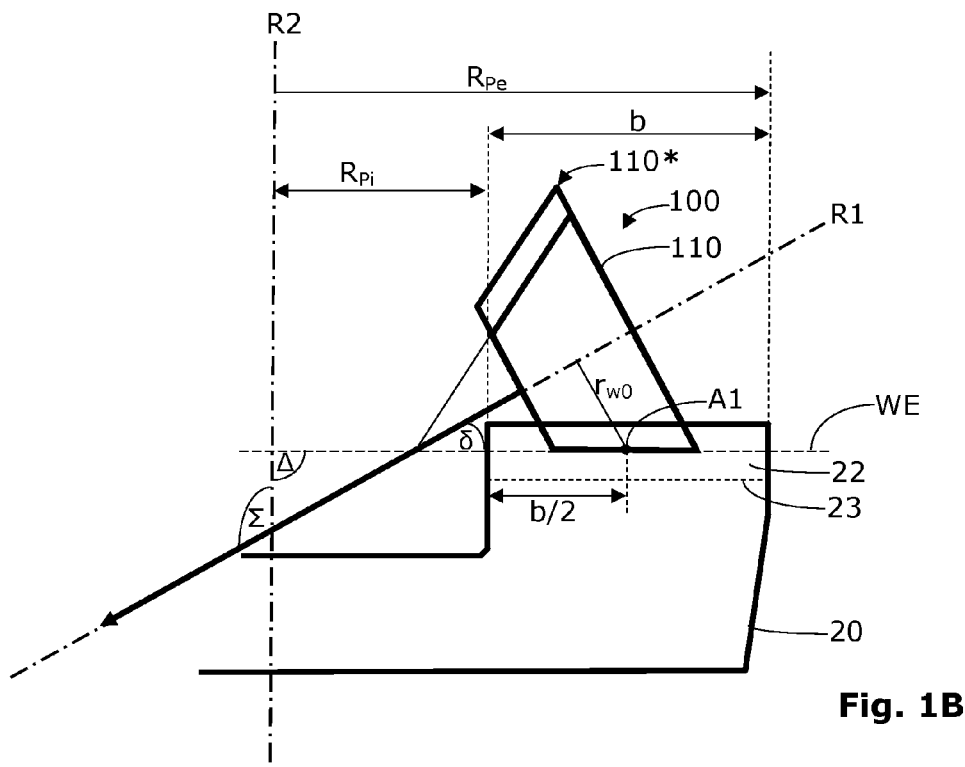
FIG. 1B shows a schematic side view of the pair according to FIG. 1A, wherein not only the main body of the power skiving tool, but rather also its skiving conical body are shown.
Figure 1C:
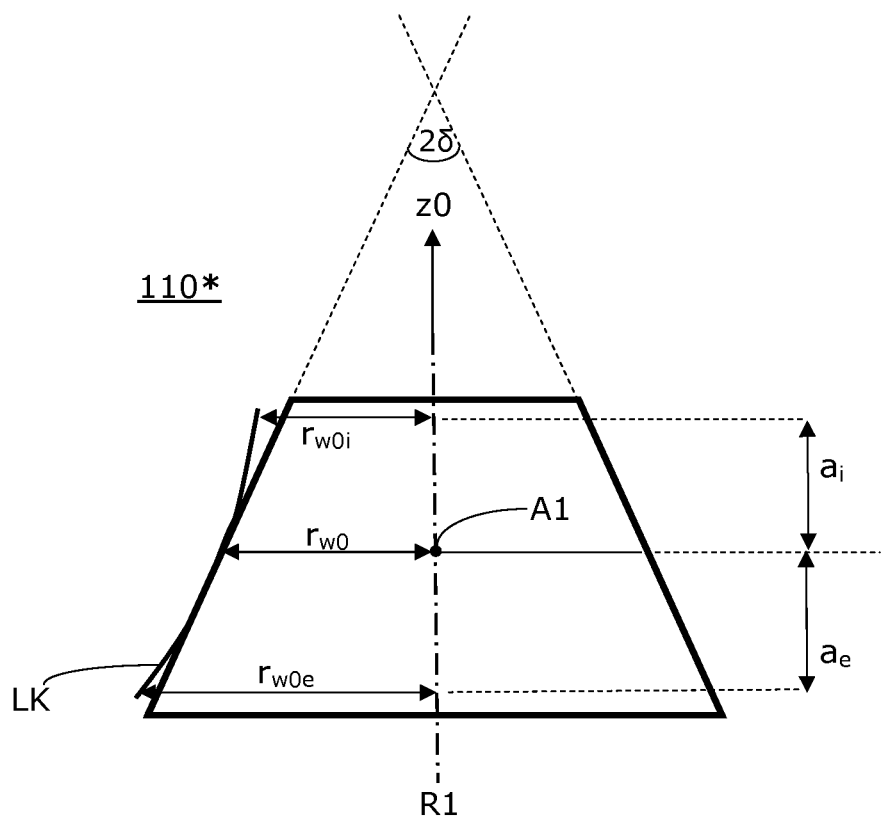
FIG. 1C shows a schematic sectional view of the conical skiving conical body (in the form of a truncated cone) of the power skiving tool of FIG. 1B in an enlarged illustration.

FIG. 1C shows the optimum skiving circle radii on the tool 100, which were ascertained for three skiving circles on the workpiece 20 selected as examples. These three skiving circle radii are identified with $r_{w0}$, $r_{w0i}$, and $r_{w0e}$. For this purpose, the middle skiving circle having the radius $r_{w0}$ on the workpiece 20 was selected at the height of half of the tooth width b/2, and the outer and the inner skiving circle were each indented by 10% from the edge, i.e., the middle radius is then at $R_{Pi}+b/2$, the inner radius at $R_{Pi}+0.1*b$, and the outer radius at $R_{Pe}-0.1*b$ (cf. FIG. 1B). As shown, $r_{w0i}$ and $r_{w0e}$ are the radii of the outer and the inner skiving circle.

The "arrow tips" of the optimum skiving circle radii of the tool 20 shown in FIG. 1C are on a slightly curved line LK, which can be replaced by an approximately straight line, for example, by a tangent on the middle circle. In this manner, the theoretical main body is approximated by a skiving conical body 110* in the form of a truncated cone, which touches it at the height of the design point A1. The angle δ is the taper angle of the truncated cone, which is used as the skiving conical body 110* (see FIG. 1C).

In the examples shown and described here, because of the described approximation, we always presume a main body 110 having constant partial taper angle δ. The axis angle Σ (see FIG. 1B) is dependent on the partial taper angle δ as follows: $\Sigma = \Delta + \delta$.

FIG. 1B shows, in very schematic form, a side view of the pair made of the workpiece 20 (a straight-toothed crown wheel here) and the power skiving tool 100 according to FIG. 1A. It is to be noted that in FIG. 1B, the crown wheel tooth width b is intentionally shown excessively large in relation to the tool size. It can be seen in FIG. 1B that the axis of rotation of the tool R1 points diagonally downward and the projection illustration shown forms an axis angle Σ with the axis of rotation R2 of the workpiece 20. It is to be noted that the axis of rotation R1 does not intersect the axis of rotation R2, but rather runs laterally past the axis of rotation R2 as a result of the axial offset a and passes through the plane (plane of the drawing of FIG. 1A), which the workpiece 20 spans. In FIG. 1B, the base 23 of a tooth gap 22 is indicated by a dashed line. The teeth of the workpiece 20 have a tooth height in the example shown that is constant along the tooth width b. The equation $b = R_{Pe} - R_{Pi}$ applies (see FIG. 1B). As shown in FIG. 1B, $R_{Pi}$ is the inner radius of the workpiece 20 and $R_{Pe}$ is the outer radius.

Therefore, as described, a partial taper angle δ can be selected, and also the location of the skiving plane, the number of the cutting teeth (called the tooth count) and the arrangement/positioning (for example, by establishing/ascertaining the axial offset a and the axis angle Σ) of the power skiving tool 100 in relation to the gear teeth of the workpiece 20 can be ascertained.

Figure 2A:
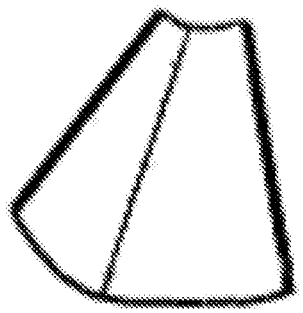
FIG. 2A shows a schematic perspective view of a single conjugated tooth.
Figure 2B:
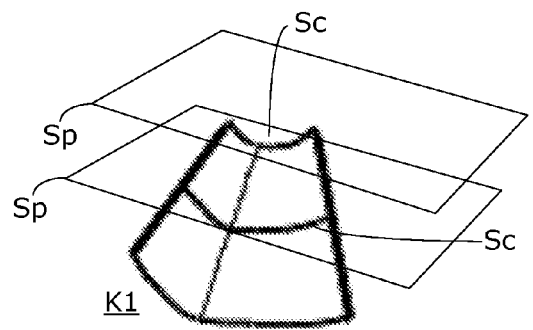
FIG. 2B shows a schematic perspective view of the conjugated tooth according to FIG. 2A, which is intersected by two cutting surfaces.
Figure 2C:
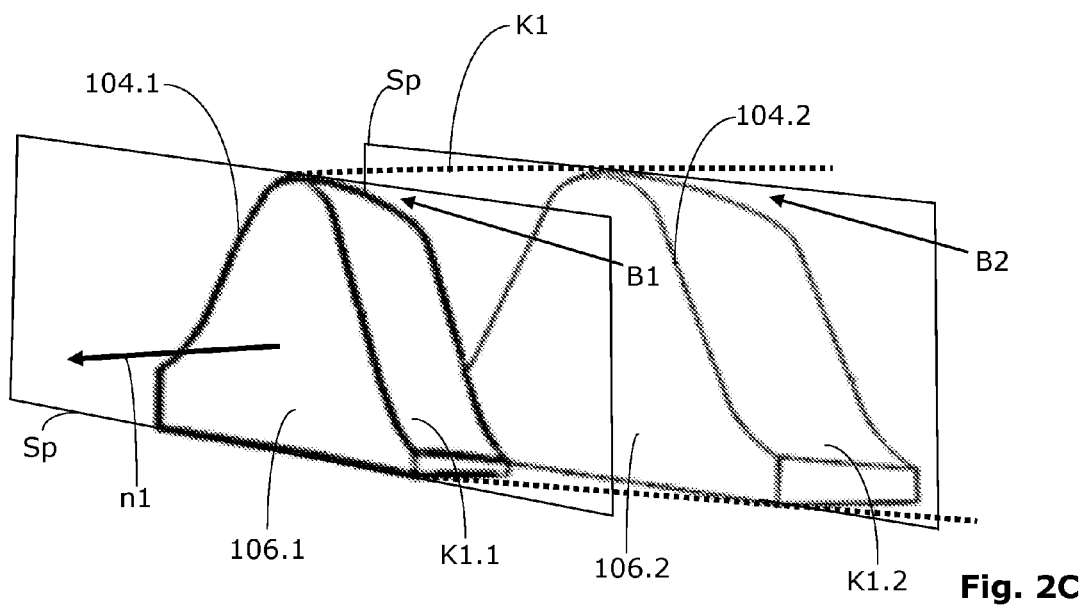
FIG. 2C shows a schematic perspective view of the contour of the conjugated tooth according to FIG. 2A, wherein the conjugated tooth was divided into two partial teeth.

Furthermore a first ascertainment or calculation of conjugated virtual teeth K (see FIGS. 2A to 2C) is performed. FIGS. 2A to 2C are to be understood as solely schematic illustrations. A spatial transmission is established by the tooth count ratio, which corresponds to the transmission ratio, and by the axial arrangement in three-dimensional space. This defines a tooth conjugated to the workpiece (tooth gap 22), which is identified here as the conjugated virtual tooth K. The taper angle δ is then determined in the design point A1, wherein it is to be considered that the tool 100 theoretically does not have an exactly conical basic shape, but rather the shape of a hyperboloid. In some embodiments, a skiving conical body 110* in the form of a truncated cone is fitted in the hyperboloid, as described.

A conjugated virtual tooth K is the precise "conjugation" of the flanks of this virtual tooth K with the tooth gap 22 on the workpiece 20.

The conjugated tooth K (FIG. 2A shows an example in schematic perspective form) or the conjugated teeth, which are mentioned multiple times here, are a type of aid or construct, to be able to better describe the derivation and the design of the tools 100. There are also other ways to perform this derivation and the design of a tool 100, as described herein and should be appreciated by those of ordinary skill in the art.

The reference sign K is used in general for conjugated teeth. To be able to differentiate single conjugated teeth along the circumference of a tool 100, a number is appended to the K as needed in each case.

In some embodiments, multiple rake face locations Sp (see FIG. 2B) are predefined along the "tooth width" and the intersection lines Sc of the rake face locations Sp with the conjugated tooth K1 are ascertained. FIG. 2B shows an example in which the virtual conjugated tooth K1 is to be used for the definition of two cutting teeth. Therefore, in this case two rake face locations Sp are predefined. In this manner, multiple cutting edges of the tool 100 are determined. To be able to place the cutting edges freely in three-dimensional space, the conjugated tooth K1 is divided or segmented, in that material of the conjugated tooth K1 is removed in the virtual model. In this case, in particular the free faces on the cutting teeth are also withdrawn in relation to the conjugated tooth K1, to ensure sufficient clearance angle. Cutting edges and rake faces thus result. These cutting edges can be distributed uniformly spaced on the tool 100, for example (for example, along the tooth width b).

FIG. 2C shows an example that was derived from FIG. 2B. The conjugated tooth K1 of FIG. 2B was divided. In this manner, two cutting teeth K1.1 and K1.2 resulted from the conjugated tooth K1. The two cutting teeth K1.1 and K1.2 are shown diagonally from above in FIG. 2C (i.e., in FIG. 2C, a view from the front end face 114 of the truncated cone is shown), so that the rake faces 106.1 and 106.2 of the two cutting teeth K1.1 and K1.2 can be recognized. The cutting edges are identified with the reference signs 104.1 and 104.2 in FIG. 2C. The normal vector n1 of the uppermost cutting phase 106.1 of the uppermost cutting tooth K1.1 of the conjugated tooth K1 is also shown in FIG. 2C. The contour of the conjugated tooth K1 is shown in FIG. 2C by two dotted polygonal chains. It can be seen in the regions B1 and B2 that material was also withdrawn on the back of the conjugated tooth K1, above all to define the cutting teeth K1.1 and K1.2, to thus provide sufficient clearance angle.

Figure 3A:
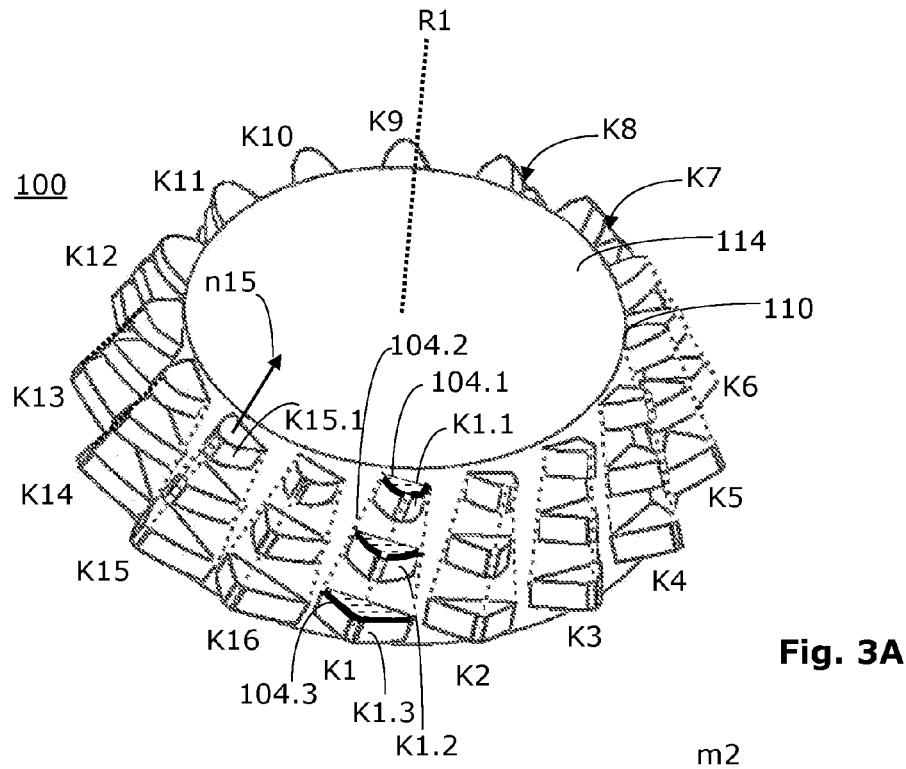
FIG. 3A shows a schematic perspective view of an exemplary embodiment of a power skiving tool, wherein the contours of the conjugated teeth are shown and the power skiving tool has three cutting teeth per conjugated tooth.

FIG. 3A shows a tool 100, which builds on the example of FIGS. 2A to 2C. Sixteen virtual conjugated teeth K1 to K16 were provided in the scope of the design on the power skiving tool 100 shown as an example. Each of these sixteen teeth K1 to K16 were divided into three cutting teeth, i.e., three rake planes Sp were predefined per conjugated tooth K here. In FIG. 3A, the three cutting teeth K1.1, K1.2, and K1.3 of the conjugated tooth K1 are provided with reference signs. To emphasize the geometrical relationship between the virtual conjugated teeth K1 to K16 and the single cutting teeth (for example, the cutting teeth K1.1, K1.2, and K1.3), the contour lines of the virtual conjugated teeth K1 to K16 are shown as dotted polygonal chains in FIG. 3A.

Each of the cutting teeth according to FIG. 3A is therefore based on a portion of a corresponding conjugated tooth K. On each cutting tooth (for example, on the cutting tooth K1.1) a cutting edge (for example, on the cutting tooth K1.1, the cutting edge 104.1) is implemented. The cutting edges 104.1, 104.2, and 104.3 are visually emphasized by thick polygonal chains in FIG. 3A. A rake face is defined on each cutting edge. The rake faces of the cutting teeth K1.1, K1.2, K1.3 are emphasized in FIG. 3A and FIG. 3B by a pattern, to make them better recognizable. The normal vector n of the rake faces is slightly inclined to the axis of rotation R1 in this exemplary embodiment and forms an acute angle with it in a planar projection. FIG. 3A shows the normal vector n15 of the uppermost rake face of the uppermost cutting tooth K15.1 of the conjugated tooth K15.

Figure 3B:
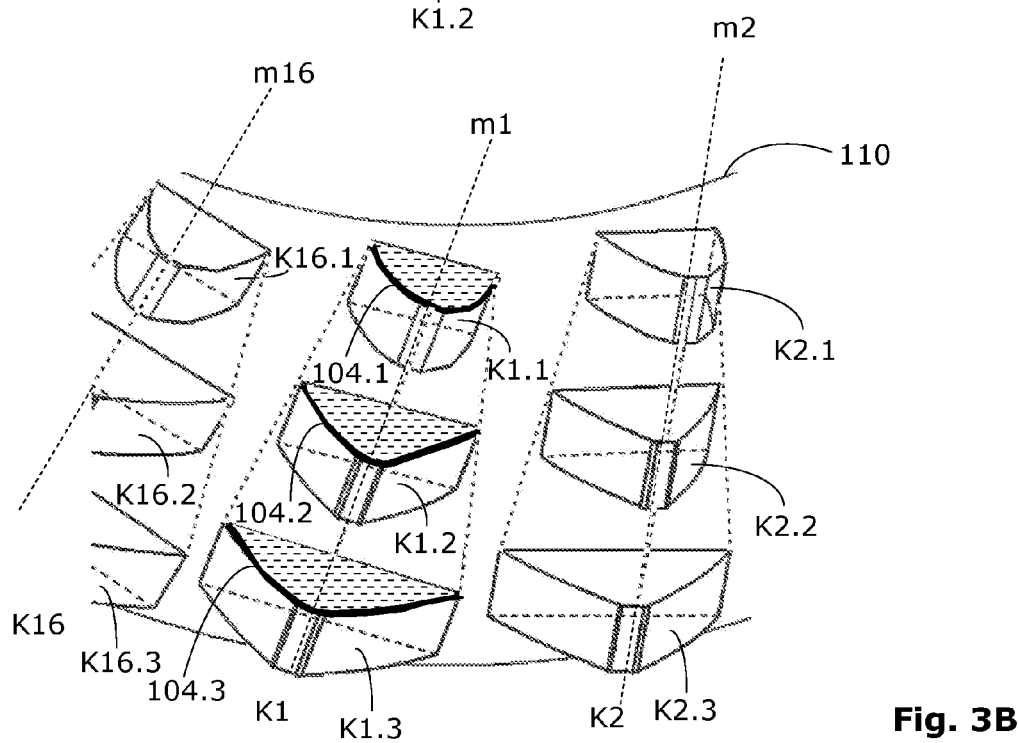
FIG. 3B shows a schematic detail enlargement of the perspective view according to FIG. 3A.

FIG. 3B shows a detail enlargement of the perspective view according to FIG. 3A. In FIG. 3B, only the contours of the conjugated teeth K1, K2, and K16 and the cutting teeth K1.1, K1.2, K1.3, K2.1, K2.2, K2.3, and K16.1, K16.2, K16.3 are visible. In this image, the three cutting edges 104.1, 104.2, and 104.3 are also visually emphasized by thick polygonal chains and the rake faces of the cutting teeth K1.1, K1.2, K1.3 are identified by a pattern.

Figure 3C:
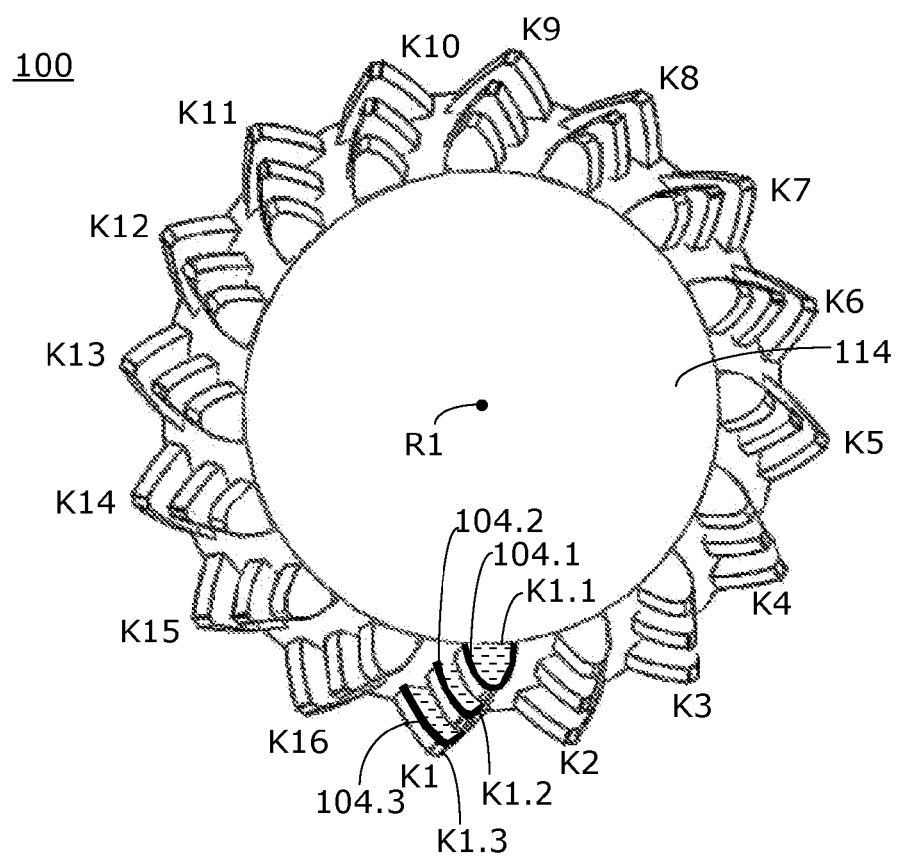
FIG. 3C shows a top view of the power skiving tool of FIG. 3A.

FIG. 3C shows a schematic top view of the power skiving tool 100 of FIG. 3A, wherein only the cutting teeth are shown here. The contour lines of the virtual conjugated teeth K1 to K16 were blanked out. A view of the upper (front) end face 114 is shown. The three cutting edges 104.1, 104.2, and 104.3 are also visually emphasized by thick polygonal chains in this image and the rake faces of the cutting teeth K1.1, K1.2, K1.3 are identified by a pattern.

In FIG. 3B, three dashed auxiliary lines m1, m2, and m16 are shown, which follow the curve of the surface normals of the rake faces of the cutting teeth. On the basis of the auxiliary lines m1, m2, m16, it can be recognized that the rake faces of the power skiving tool 100 shown are slightly inclined and the auxiliary lines do not have a shared point of intersection with the tool axis R1 in this case. These auxiliary lines lie on a hyperboloid (see, for example, FIG. 7). In the special case of a workpiece 20 having straight cutting teeth, the hyperboloid degenerates to a cone. I.e., in this special case, the auxiliary lines intersect the axis of rotation R1. This special case also falls in the scope of protection of the present application.

In the example according to FIGS. 3A to 3C, the individual cutting teeth within each virtual conjugated tooth differ. Thus, for example, all three cutting teeth K1.1, K1.2, K1.3 of the virtual conjugated tooth K1 are different. The uppermost conjugated tooth K1.1 of the conjugated tooth K1 is implemented identically as the uppermost cutting teeth of all other conjugated teeth, however. Expressed simply, the following relationship applies, for example: K1.1=K2.1= . . . =K16.1. This principle applies not only for the uppermost cutting tooth, but also for all other cutting teeth of a tool 100 according to this embodiment.

The shape of such a power skiving tool 100 is reminiscent in the broadest sense of a pinecone or a part of a pinecone.

Due to the use of multiple cutting edges (for example, the cutting edges 104.1, 104.2, 104.3) over the tooth width b, the proposed power skiving tool 100 does not have to be moved over the entire tooth width b to implement an entire tooth gap 22 on the workpiece 20. Depending on the relative dimension of the power skiving tool 100 in relation to the size of the workpiece 20, or respectively to the tooth width b, the power skiving can be executed without the power skiving tool 100 having to be moved in the tooth width direction (i.e., along the tooth gap 22). However, embodiments are also possible in which a small movement of the power skiving tool 100 in the tooth width direction is necessary.

Specific cutting edges are intended for the machining of specific regions of the gear teeth. If these regions are sufficiently small (i.e., more cutting teeth are provided per conjugated virtual tooth K), the generated deviations to the setpoint geometry are thus also small If the power skiving tool 100 is not sufficiently large and its cutting teeth (for example, the cutting teeth K1.1, K1.2, K1.3) are not positioned such that an entire tooth gap 22 can be generated without displacement movement, the rotational movement of the power skiving tool 100 about the tool axis R1 and the rotational movement of the workpiece 20 about the workpiece axis R2 are overlaid with a linear displacement movement in the tooth width direction. Thus, a large (in the sense of wide) tooth gap 22 can also be machined using a relatively small (in the sense of thin) tool 100.

The piercing of the power skiving tool 100 into the material of the workpiece 20 is performed from above along the tooth width b, using all cutting teeth simultaneously. Subsequently, a movement sequence can occur, as is known from power skiving using cutting wheels.

Figure 4A:
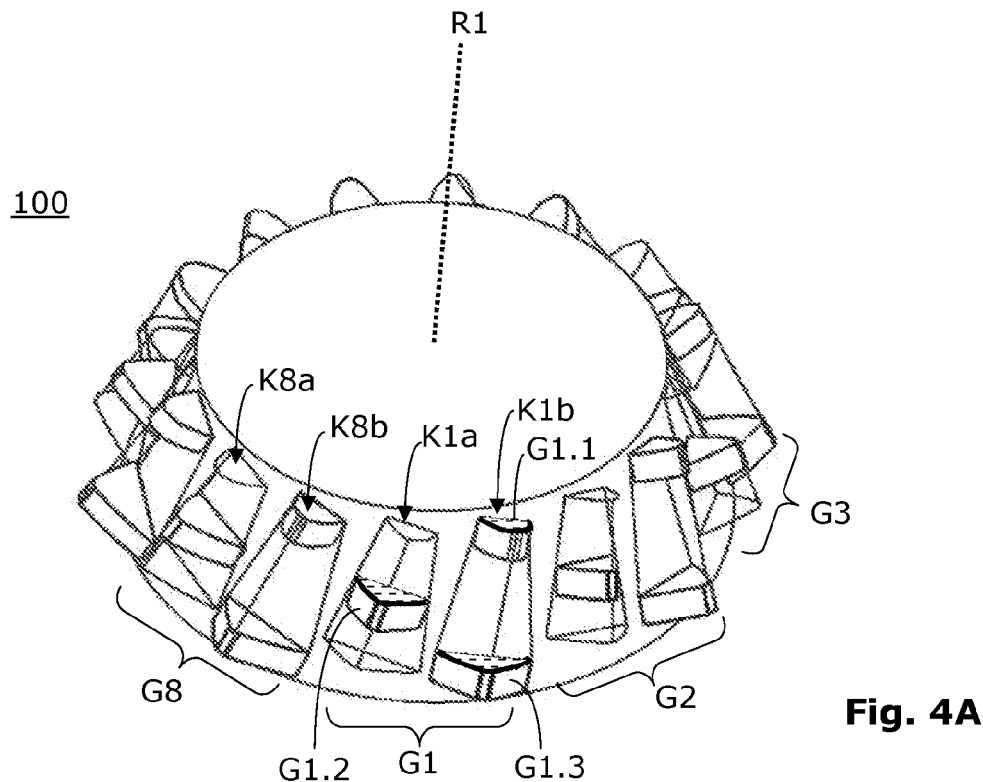
FIG. 4A shows a schematic perspective view of a second embodiment of a power skiving tool, wherein the power skiving tool has cutting teeth arranged by groups in groups of two and wherein each group of two comprises three cutting teeth.

FIG. 4A shows a schematic perspective view of a second embodiment of a power skiving tool 100. The power skiving tool 100 shown comprises cutting teeth arranged by groups in groups of two. The power skiving tool 100 according to FIG. 4A comprises a total of eight groups of two G1 to G8. Four of these eight groups of two are provided in FIG. 4A with the reference signs G1, G2, G3, and G8.

In the example shown, each of the groups of two is built on two adjacent conjugated teeth, which are identified in the first group G1 with K1a and K1b. In the eighth group G8, the conjugated teeth are identified with K8a and K8b. As already described above, the conjugated teeth are used for the derivation or definition of the actual cutting teeth. In the example shown here, a middle cutting tooth G1.2 is defined on the first conjugated tooth K1a. An upper and a lower cutting tooth G1.1 and G1.3 are defined on the second conjugated tooth K1b. The two cutting teeth G1.1 and G1.3 are seated offset to the middle cutting tooth G1.2. Cutting edges and rake faces also result here due to the splitting or dividing of the virtual conjugated teeth. The rake faces of the groups (for example, the group G1) are offset to one another.

Figure 4B:
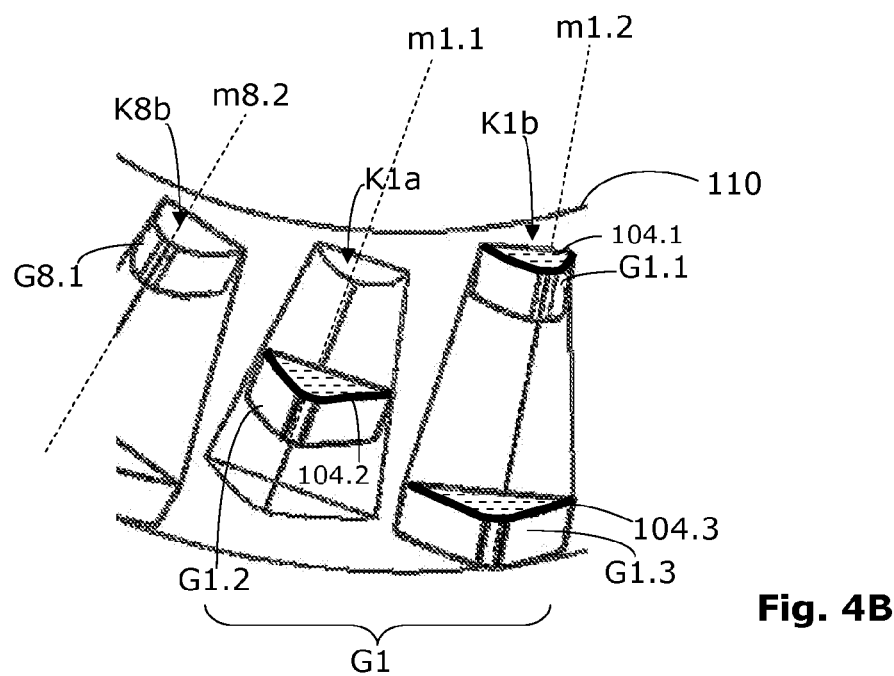
FIG. 4B shows a schematic detail enlargement of the perspective view according to FIG. 4A.

FIG. 4B shows a detail enlargement of the perspective view according to FIG. 4A. Only the contours of the conjugated teeth K1a, K1b, and K8b and the four cutting teeth G1.1, G1.2, G1.3, G8.1 are visible in FIG. 4B. In this image, the three cutting teeth 104.1, 104.2, and 104.3 are also visually emphasized by thick polygonal chains and the rake faces of the cutting teeth G1.1, G1.2, G1.3 are identified by a pattern. The three cutting teeth G1.1, G1.2, G1.3 belong to the group G1 and the single visible cutting tooth G8.1 belongs to the group G8. In the image of FIG. 4B, the three cutting teeth 104.1, 104.2, and 104.3 of the group G1 are visually emphasized by thick polygonal chains. The rake faces of the group G1 are identified by a pattern.

In FIG. 4B, three dashed auxiliary lines m1.1, m1.2, and m8.2 are shown, which follow the profile of the rake face normals. On the basis of the auxiliary lines m1.1, m1.2, and m8.2, it can be recognized that the rake faces of the power skiving tool 100 shown are slightly inclined and the auxiliary lines also do not have a shared point of intersection with the tool axis R1 in this case.

Figure 4C:
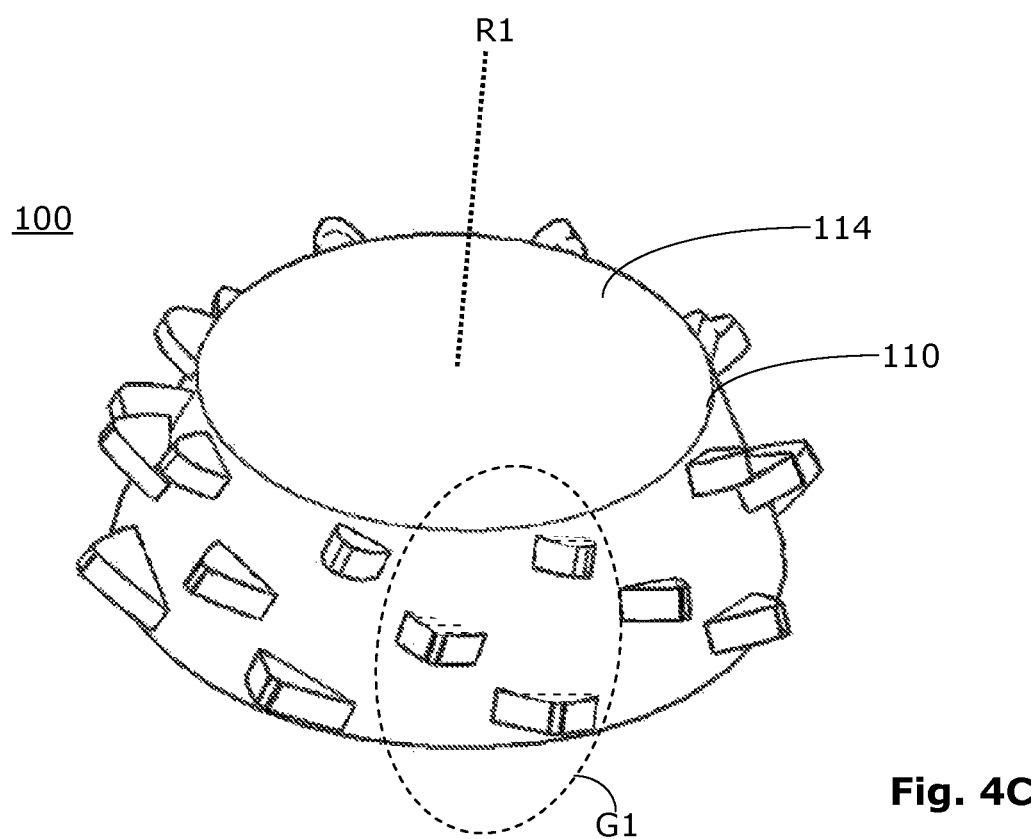
FIG. 4C shows a schematic perspective view of the power skiving tool of FIG. 4A, wherein one of the groups is identified here.

FIG. 4C shows a schematic perspective view of the power skiving tool 100 of FIG. 4A, wherein the individual cutting teeth and the arrangement thereof on the main body 110 are visible here. The contour lines of the virtual conjugated teeth K1a to K8b were blanked out.

In the example according to FIGS. 4A to 4C, the cutting teeth of the individual virtual conjugated teeth differ within a group and the group repeats multiple times along the circumference of the power skiving tool 100. Thus, for example, all three cutting teeth G1.1, G1.2, G1.3 of the first group G1 are different.

A further embodiment can be derived from the example according to FIGS. 4A to 4C, in which only one cutting tooth is defined from three adjacent virtual conjugated teeth. All of these three cutting teeth are different from one another and are on different diameters of the main body 110. In this embodiment, three adjacent virtual conjugated teeth are to be assigned to each group. These groups repeat multiple times along the circumference of the power skiving tool 100.

Figure 5A:
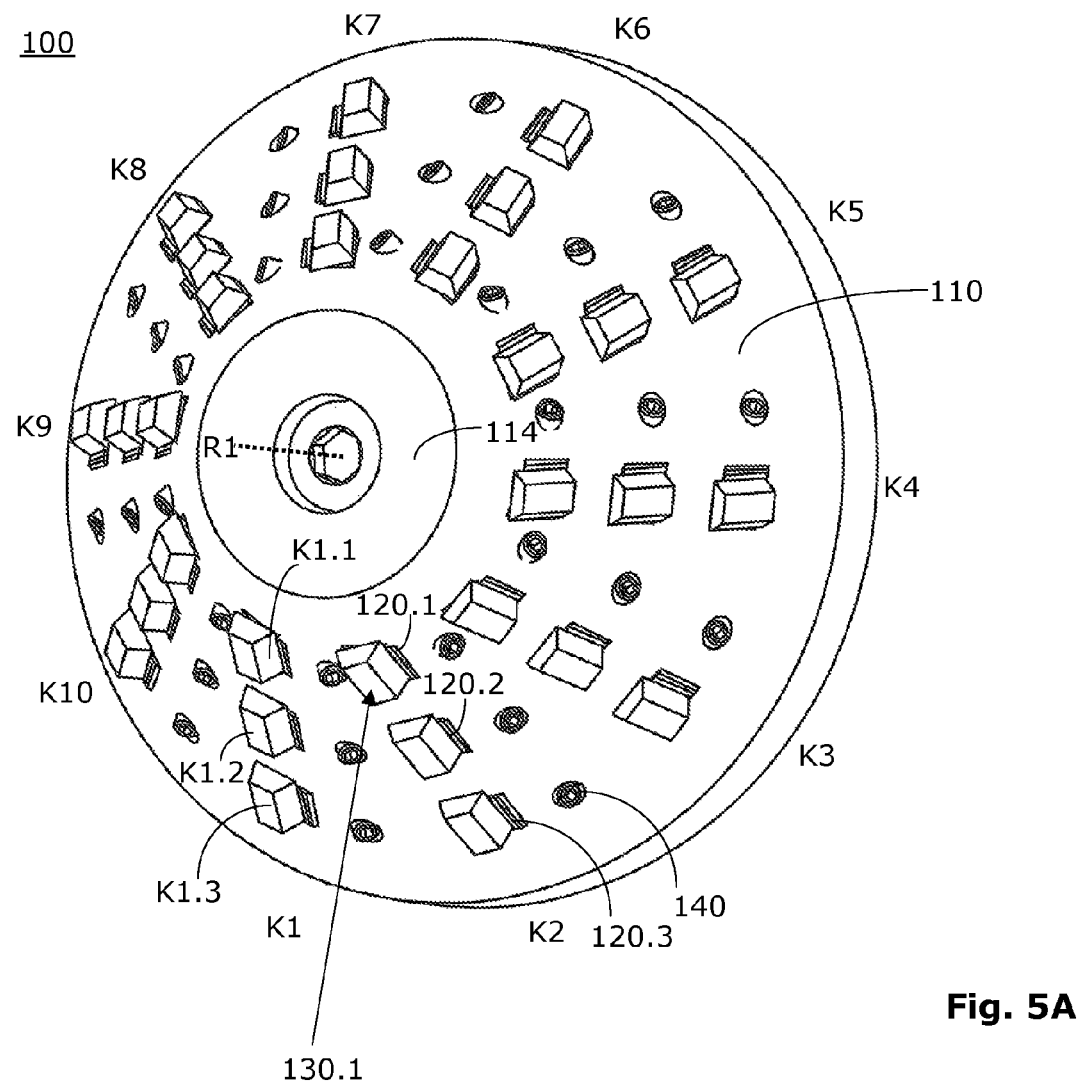
FIG. 5A shows a perspective view of a third embodiment of a power skiving tool, which is equipped with bar cutters.

FIG. 5A shows a schematic perspective view of a third embodiment of a power skiving tool 100. The power skiving tool 100 shown is equipped with bar cutters. In the example shown, each conjugated tooth K1 to K10 is resolved into three individual teeth, wherein each of these individual teeth is implemented by the head region of a corresponding bar cutter. The three teeth K1.1, K1.2, and K1.3 of the first conjugated tooth K1 are marked with reference signs in FIG. 5A.

To be able to insert the bar cutter in the main body 110, which is in the form of a truncated cone, of the power skiving tool 100 and fasten it therein, one receptacle opening per bar cutter is provided in the main body 110. Three of the receptacle openings are identified with the reference signs 120.1, 120.2, 120.3 in FIG. 5A.

Figure 5B:
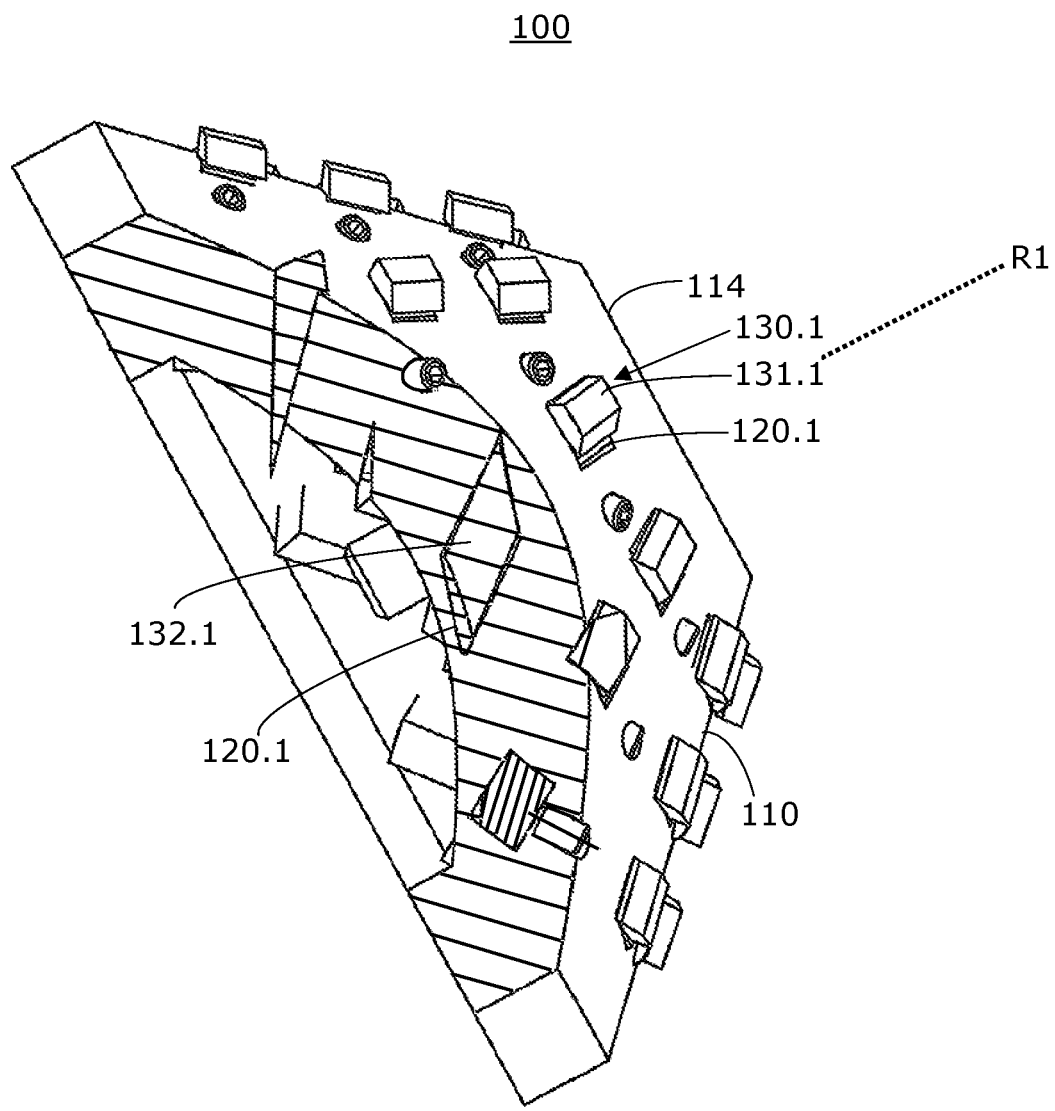
FIG. 5B shows a sectional view of the third embodiment according to FIG. 5A.

FIG. 5B shows a section. It can be recognized on the basis of this sectional view, for example, how the receptacle opening 120.1 extends from the lateral surface of the truncated cone into the interior of the main body 110. Of the bar cutter 130.1, which is seated in this receptacle opening 120.1, the head region 131.1, on the one hand, and a part of the shaft 132.1, on the other hand, can be recognized.

It is indicated in FIGS. 5A and 5B that one fastening screw is provided per bar cutter. One of these fastening screws is identified with the reference sign 140.

In general, it can be stated that the rake faces of the cutting teeth are oriented forward in some embodiments (for example, as shown in FIGS. 3A to 5B), i.e., the rake faces point toward the cone tip (where the partial taper angle $\delta$ of the tool 100 is defined) of the main body 110, which is in the form of a truncated cone, of the power skiving tool 100.

However, in some embodiments, the rake faces of the cutting teeth may be oriented to the rear, i.e., the rake faces point away from the cone tip. In such embodiments, the design of the free faces is more complex.

If the cutting surface normal n of all cutting teeth are plotted in the form of beams, it can be recognized that the following statements apply. These statements can also be transferred to the orientation of the conjugated teeth.

The beams do not intersect in those embodiments that are built on a hyperboloid.

The beams do not intersect the axis of rotation R1 in those embodiments that are built on a hyperboloid, and each of the beams encloses an acute angle, which may be less than 40°, with the axis of rotation R1 in a projection in the axis plane.

In the special case, in which the hyperboloid degenerates to form a cone, the beams intersect with the axis of rotation R1 in a shared point of intersection.

In general, it can be stated that in the case of axially-offset power skiving, the tool axis of rotation R1 forms an axis angle $\Sigma$ with the workpiece axis of rotation R2 (see FIG. 1B), for which the following statements apply. The following assumptions are presumed: $60°<\Delta<120°$ and $0°<\delta<60°$; the axis angle $\Sigma$ is in the range between 60° and 150° in a workpiece 20 having a face angle $\Delta$, which is less than 90°; the axis angle $\Sigma$ is in the range between 90° and 150° in a workpiece 20 having a face angle $\Delta$ of 90°; and the axis angle $\Sigma$ is in the range between 90° and 180° in a workpiece 20 having a face angle Δ, which is greater than 90°.

Furthermore, it can be stated in general that the cutting teeth of the tools 100 protrude substantially radially out of a lateral surface of the skiving conical body 110*.

Figure 6:
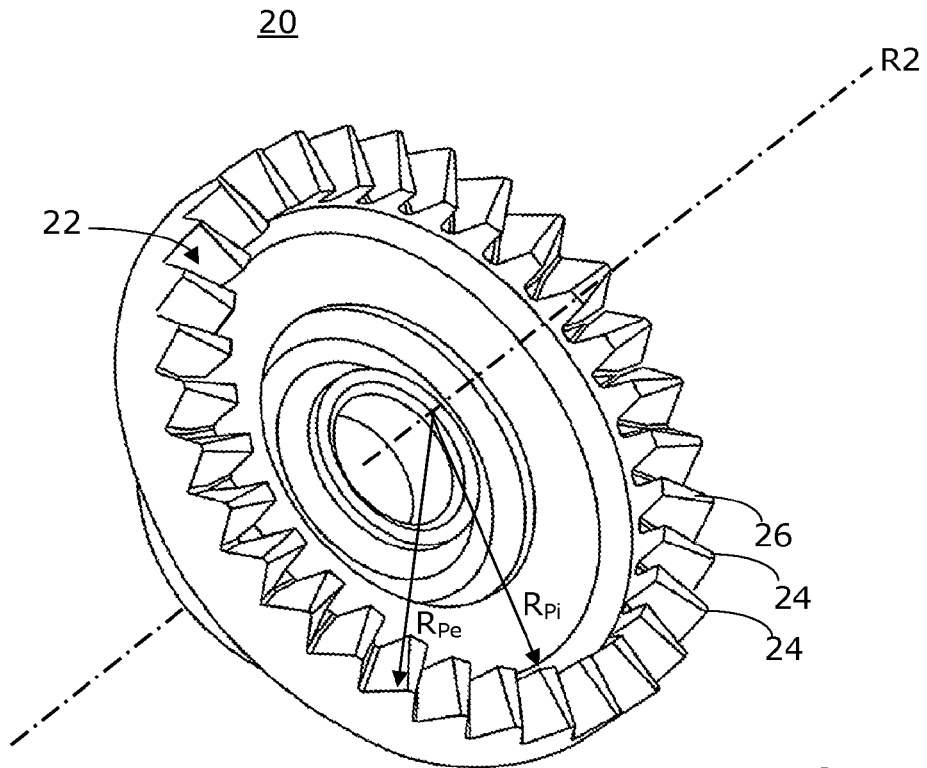
FIG. 6 shows a perspective view of a crown wheel which was machined by a power skiving method.

Furthermore, it can be stated in general that the rake faces of the tools 100 have a rake face normal n, which encloses an acute angle, which is less than 40°, with the tool axis of rotation R1. This angle is in the range of 0 to 30°, wherein the lower limit equal to zero is also included as a special case FIG. 6 shows an exemplary machined crown wheel 20. Some of the teeth of the crown wheel 20 are identified with the reference sign 24. The teeth 24 extend in the radial direction and are arranged coplanar here. The tooth head 26 of each of the teeth 24 tapers with increasing radial spacing from the workpiece axis R2

Figure 7:
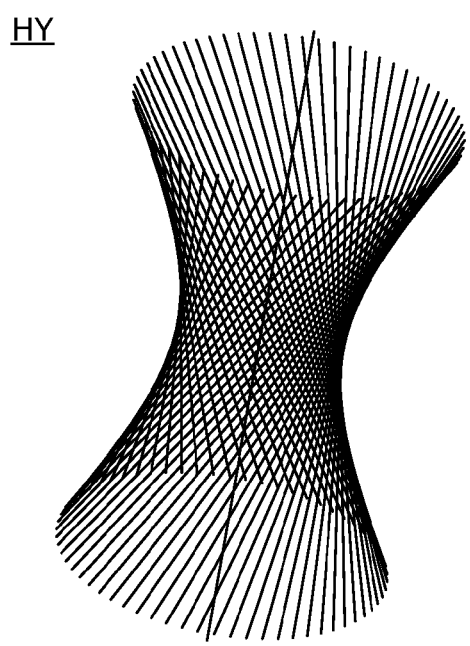
FIG. 7 shows a perspective view of a hyperboloid of one sheet, which is composed of a family of beams.

FIG. 7 shows an exemplary hyperboloid HY. Specifically, this is a hyperboloid of one sheet. For example, the curve of the rake face normals can be recognized on the basis of FIG. 7, wherein the axis of rotation of the hyperboloid HY is coincident with the axis of rotation R1.

As may be recognized by those of ordinary skill in the pertinent art based on the teachings herein, numerous changes and modifications may be made to the above-described and other embodiments without departing from its scope as defined in the claims. Accordingly, this detailed description of embodiments is to be taken in an illustrative, as opposed to a limiting sense.

What is claimed is:

1. A power skiving tool for producing several tooth gaps by means of a power skiving method on a ring-shaped or disk-shaped workpiece, which has a workpiece axis of rotation, the power skiving tool comprising:
   a tool axis of rotation thereof;
   a skiving conical body arranged rotationally-symmetrically to the tool axis of rotation and defining a hyperboloid or truncated cone; and
   a plurality of cutting teeth, which protrude approximately radially out of a lateral surface of the skiving conical body;
   wherein each of the cutting teeth has a rake face and at least one cutting edge,
   wherein each rake face defines a cutting surface normal, which encloses an acute angle less than about 40°, with respect to the tool axis of rotation, and wherein the power skiving tool is configured for axially-offset power skiving of the workpiece, and
   wherein at least two of said cutting teeth are located on different diameters of the skiving conical body.

2. The power skiving tool according to claim 1, wherein the acute angle is in the range of about 0 to about 30°.

3. The power skiving tool according to claim 1, wherein, during the axially-offset power skiving, the tool axis of rotation forms an axis angle with respect to the workpiece axis of rotation, and wherein the axis angle is between about 60° and about 150° for a workpiece having a face angle less than 90°, the axis angle is between about 90° and about 150° for a workpiece having a face angle of 90°, and the axis angle is between about 90° and about 180° in a workpiece having a face angle greater than 90°.

4. The power skiving tool according to claim 1, wherein the skiving conical body comprises at least one first cutting tooth and one second cutting tooth for power skiving a shared tooth gap of the workpiece.

5. The power skiving tool according to claim 1, further comprising a plurality of cutting levels.

6. The power skiving tool according to claim 2, wherein the skiving tool defines a cutter head tool, and the skiving conical body comprises a main body including receptacle regions configured to receive and fasten bar cutters therein, wherein the cutter head tool comprises multiple bar cutters inserted and fastened in the receptacle regions and each of the bar cutters forms an additional cutting tooth of the power skiving tool.

7. The power skiving tool according to claim 1, further comprising cutting edges disposed on different diameters of the skiving conical body.

8. The power skiving tool according to claim 1, wherein the skiving tool defines a solid tool, and wherein the plurality of cutting teeth and a main body of the conical body are manufactured from one material.

9. The power skiving tool according to claim 1, wherein the skiving tool defines a cutter head tool, and the skiving conical body comprises a main body including receptacle regions configured to receive and fasten bar cutters therein, wherein the cutter head tool comprises multiple bar cutters inserted and fastened in the receptacle regions and each of the bar cutters forms an additional cutting tooth of the power skiving tool.

10. The power skiving tool according to claim 2, wherein, during the axially-offset power skiving, the tool axis of rotation forms an axis angle with respect to the workpiece axis of rotation, and wherein the axis angle is between about 60° and about 150° for a workpiece having a face angle less than 90°, the axis angle is between about 90° and about 150° for a workpiece having a face angle of 90°, and the axis angle is between about 90° and about 180° in a workpiece having a face angle greater than 90°.

11. The power skiving tool according to claim 2, wherein the skiving conical body comprises at least one first cutting tooth and one second cutting tooth for power skiving a shared tooth gap of the workpiece.

12. The power skiving tool according to claim 2, further comprising a plurality of cutting levels.

13. The power skiving tool according to claim 3, further comprising a plurality of cutting levels.

14. The power skiving tool according to claim 2, further comprising cutting edges disposed on different diameters of the skiving conical body.

15. The power skiving tool according to claim 2, wherein the skiving tool defines a solid tool, and wherein the plurality of cutting teeth and a main body of the conical body are manufactured from one material.

* * * * *